Nov. 5, 1957 A. E. ANDERSON 2,812,445

TRANSISTOR TRIGGER CIRCUIT

Filed Nov. 16, 1951 3 Sheets-Sheet 1

INVENTOR
A. E. ANDERSON
BY H. A. Burgess
ATTORNEY

Nov. 5, 1957 A. E. ANDERSON 2,812,445

TRANSISTOR TRIGGER CIRCUIT

Filed Nov. 16, 1951 3 Sheets-Sheet 2

INVENTOR
A. E. ANDERSON
BY
H. A. Burgess
ATTORNEY

INVENTOR
A. E. ANDERSON
BY H. A. Burgess
ATTORNEY 2,812,445

TRANSISTOR TRIGGER CIRCUIT

Alva Eugene Anderson, Mountainside, N. J., assignor to Bell Telephone Laboratories, Incorporated, New York, N. Y., a corporation of New York Application November 16, 1951, Serial No. 256,708

6 Claims. (Cl. 250—211)

This invention relates to signal translation circuits employing transistors which, in the illustrative embodiments described below, display characteristics of a negative resistance over at least a portion of their operating range.

Transistors are now well known and are described, for example, in an article entitled "Some Circuit Aspects of the Transistor," by R. M. Ryder and R. J. Kircher, which appears in the Bell System Technical Journal for July 1949, as well as in Patent 2,524,035, to J. Bardeen and W. H. Brattain, dated October 3, 1950. In general, transistors comprise a body of semiconductive material such as germanium with which three electrodes designated emitter, collector, and base make operative contact. With one type of transistor designated point contact or type A, the semiconductive body is composed of n- or p-type material; the emitter and collector electrodes make high resistance point contacts with the semiconductive body; while the base electrode makes a large area ohmic contact with the semiconductive body. P- and n-type point contact transistors differ primarily in the directions of normal current flow and the polarities of applied voltage. Most point contact transistors display the phenomenon of current multiplication; i. e., increases in the current flowing in the emitter electrode will result in even larger increases in the current flowing in the collector electrode. With n-type units, the emitter current in the active region will flow into the semiconductive body and the collector current will flow out of the semiconductive body; the reverse will be true of p-type units. Other types of transistors employ the rectifying properties of p-n junctions to perform the function of emitter and collector electrodes and are known, for example, as n-p-n or p-n-p transistors.

Other types, known as phototransistors, employ light-sensitive semiconductive material such as germanium. These are described, for example, in an article by J. N. Shive, entitled "The Phototransistor," published in the Bell Laboratories Record for August 1950. Light of sufficient intensity, falling on the light-sensitive body, emits hole-electron pairs. In the case of n-type material, the holes of these pairs act much in the same manner as if they had been injected by an emitter electrode; with p-type material, the electrons are the anomalous carriers. Light may therefore be used in place of or in addition to an emitter electrode to exert control over the collector current.

An object of the invention is to translate a light signal into a strong electrical signal whose duration is directly related to the duration of the light signal.

Another object is to regeneratively translate signals in the form of recurrent pulses of light into recurrent electrical pulses whose wave shapes and amplitudes are constant, regardless of variations above a threshold level of the intensity of the input light signals.

It is also an object of the invention to regenerate a pulse, whether of current or of light, and to produce an output pulse whose duration is directly related to the duration of the input pulse.

Another object of the invention is to regenerate a length-modulated pulse without destroying the modulation.

The circuits described below to illustrate the present invention are based on transistor trigger circuits of the type disclosed in a copending application of A. J. Rack, Serial No. 79,861, filed March 5, 1949. These circuits display characteristics of negative resistance over a portion of their operating range. In these particular circuits, the negative resistance characteristic is produced by a relatively large resistor connected in series with the base electrode which provides regenerative feedback from the collector to the emitter electrodes. The feedback is regenerative over a range of positive emitter currents by virtue of the current multiplication charatceristic of the transistor employed and due to the fact that positive emitter current results in negative collector current; it is the collector current flowing through the feedback resistor which provides the regeneration. The negative resistance characteristic may readily be seen by referring to any of the two-terminal current-voltage relationships of the transistors, as, for example, the emitter current versus emitter voltage characteristic, collector current versus collector voltage, or base current versus base voltage characteristics. The emitter current versus emitter voltage characteristic, for example, resembles the letter N. The stable operating point or points, if any, are determined by a load-line resistor connected, for example, from the emitter to ground, assuming the feedback promoting resistor to be returned to ground. By proper adjustment of the magnitude of this resistor and by the adjustment of a relatively small negative bias applied in series with this resistor, the circuit may be made astable, monostable, or bistable, depending graphically on the intersection of the load line and the current-voltage characteristic and also, in some cases, on the slope of the load line.

In a particular embodiment of the invention to be described in more detail below, a photosensitive transistor, such as a phototransistor, is connected in a trigger circuit configuration of the type just described. In accordance with the invention, however, the load-line resistor is proportioned so that the load line will lie substantially parallel to the region of negative slope in the emitter current versus emitter voltage characteristic. Further, the emitter biasing battery which is connected in series with the load-line resistor applies to the emitter electrode a biasing potential which is slightly more negative than the emitter voltage at zero emitter current. A source of light which may be modulated by any suitable means is positioned to emit light on the photosensitive surface of the transistor. When the light is off, the circuit has but one stable operating point. This point is in the cut-off region so that, in the absence of input light signals, the circuit will be stable in the "off" condition, i. e., there will be relatively small collector current flowing. When light of sufficient intensity is applied to the transistor, however, the circuit will have a second stable point in the positive emitter current region of positive slope, and the circuit will trigger to this point and remain there as long as the light is kept on. During this time a relatively large current will flow in the collector electrode; the collector, therefore, presents a logical element from which a useful output may be taken. When the light is removed, and only then, the circuit returns to the "off" condition. The circuit just described may alternatively be triggered by electrical pulses as well as light pulses.

A feature of the invention is that the duration of the output pulses is directly related to the duration above a threshold value of the input pulses. Another feature of the invention is that the circuit will switch very rapidly from its stable "off" operating point to the stable "on" point, and vice versa. Another feature is that uniformly shaped output signals are obtained even though the input signals barely exceed a threshold value.

The illustrative circuits described below employ a feedback promoting resistor connected in the base circuit to achieve the negative resistance characteristic. Since this type of regeneration requires current multiplication, the invention will be described as relating to point contact transistors and, more particularly, to n-type point contact transistors. In accordance with the usual conventions, electrode currents for this type of transistor are deemed "positive" if they flow from the electrode into the semiconductive body. It should be understood that other types of transistors may be employed in this type of a regenerative circuit so long as they have a current multiplication factor ($\alpha$) greater than unity. Further, other types of regeneration may be used, such as alternating-current feedback, e. g., capacitive coupling from collector to emitter or transformer coupling from collector to emitter; with transformer coupling, for example, it will not be necessary that $\alpha > 1$.

The invention, its objects, and features may be better understood from a consideration of the following detailed description when read in accordance with the attached drawings, in which.

Figure 6:
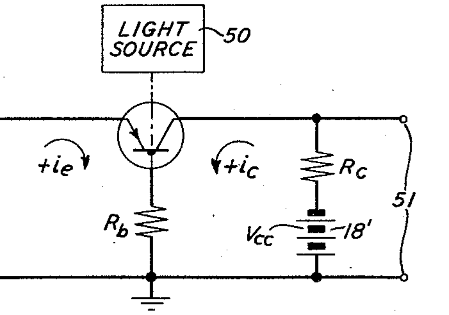
Figure 7:
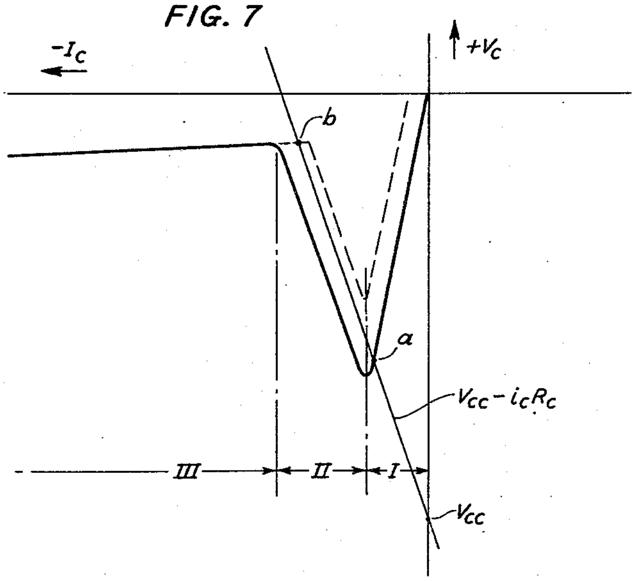
Figure 8:
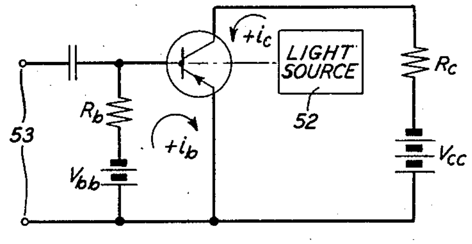
Figure 9:
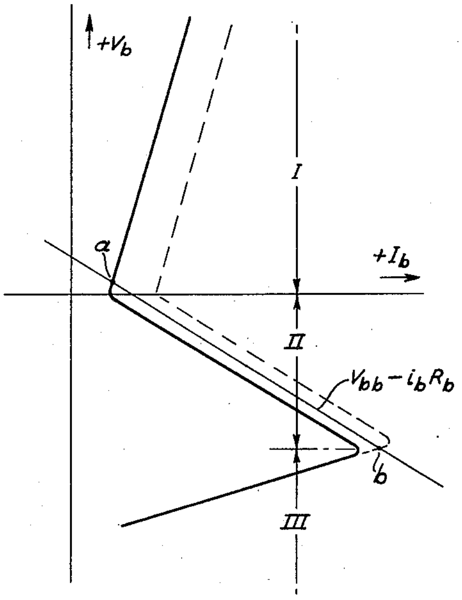
Figure 10:
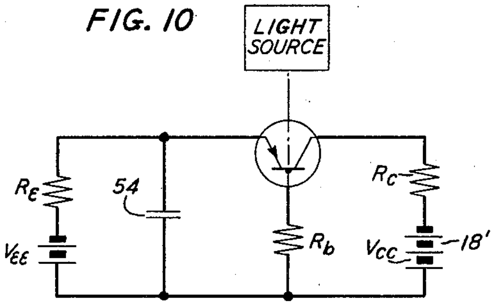
Figure 11:
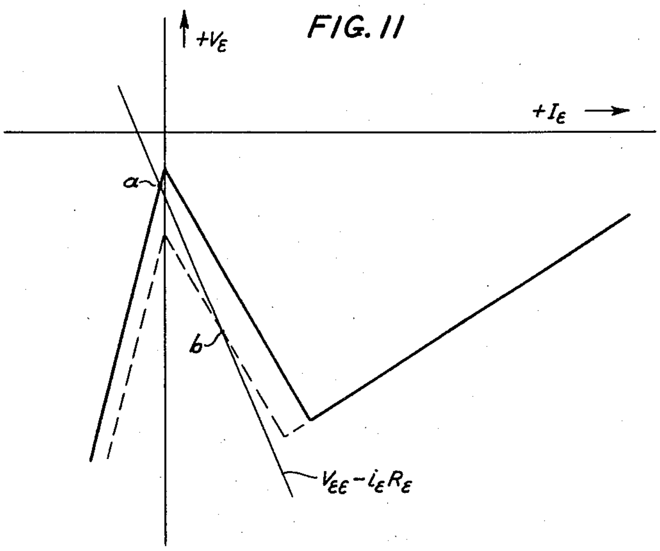

Figs. 6 and 8 also show circuits illustrative of the present invention;

Figs. 7 and 9 illustrate, respectively, characteristics of the circuits of Figs. 6 and 8;

Fig. 10 illustrates schematically a photosensitive start-stop pulse generator; and Fig. 11 illustrates characteristics of the circuit of Fig. 10.

Figure 1:
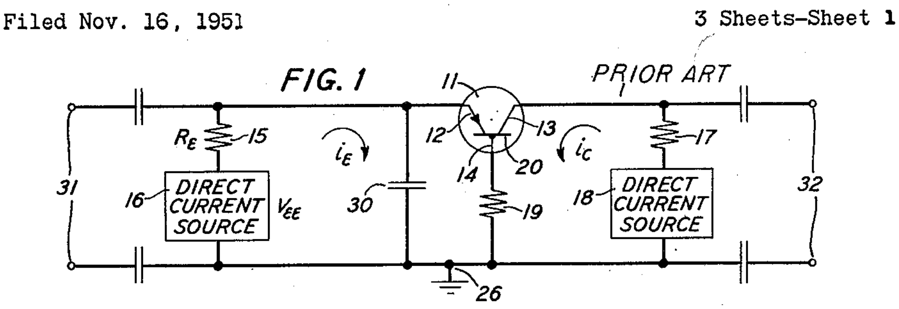
Fig. 1 illustrates a prior art transistor trigger circuit.

The circuit shown in Fig. 1 is generally of the type described in the above-mentioned Rack application. Its central element is a current multiplication transistor 11 with which an emitter electrode 12, collector electrode 13, and base electrode 14 make operative contact. The emitter and base electrodes are interconnected by a first circuit which includes the "load-line" resistor 15 and a direct-current biasing source 16. The collector and base electrodes are interconnected by a second circuit which includes a collector resistor 17 and a collector supply comprising the direct-current source 18. Connected in series with the base electrode 14 and common to the two circuits just described is a feedback promoting resistor 19 which, for example, may have a value on the order of 10,000 ohms. The directions of assumed positive emitter and collector currents $i_\epsilon$ and $i_c$ are indicated on the drawing. Assuming the semiconductor body 20 of the transistor to be composed of n-type material, the emitter current in the active region will be positive, while the collector current will be negative.

Figure 2:
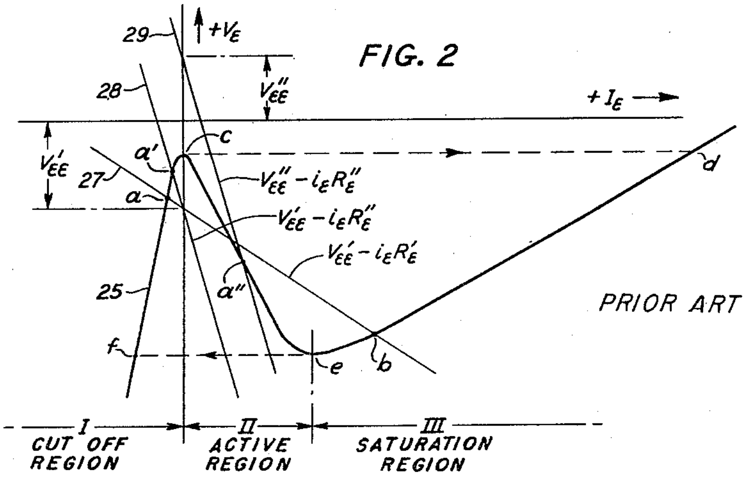
Fig. 2 illustrates the emitter current versus emitter voltage characteristic of the circuit of Fig. 1 with several values of resistance for the load-line resistor $R_\epsilon$.

The N-shaped characteristic 25 in Fig. 2 illustrates the emitter current versus emitter voltage characteristic of the circuit of Fig. 1, the emitter voltage $V_\epsilon$ being measured from the emitter 11 to a point of reference potential which is arbitrarily taken as ground at 26. For discussion purposes, this characteristic will be divided into three regions. Region I lies to the left of the voltage ordinate. This region is characterized by negative emitter current; it is called the "cut-off region," since substantially no collector current will flow for values of emitter current in this region. The slope in region I is positive and fairly steep, as may be seen in the figure. Region II includes the region of negative slope and is called the "active region." The region beyond region II, region III, is called the "saturation" or "collector current overload region"; in this region, the equivalent collector resistance reduces to substantially zero so that the collector voltage will remain substantially constant despite increases in collector current.

Three illustrative load lines 27, 28, and 29 have been superimposed on the characteristic in Fig. 2 representing three values of resistance for resistor 15, $R_\epsilon$ and two values of voltage $V_{\epsilon\epsilon}$ for the direct-current source 16. These load lines are essentially the characteristics of the resistor 15 and the direct-current supply 16 and represent the voltage from emitter to ground 26 which is equal to the supply voltage $V_{\epsilon\epsilon}$ minus the drop across the load-line resistor, $i_\epsilon R_\epsilon$. Load line 27 illustrates an intermediate value of resistance $R_\epsilon'$ and an emitter biasing voltage $-V_{\epsilon\epsilon}'$. This load line intersects the characteristic in both regions of positive resistance, representing two stable operating points. When the circuit is initially turned on, it will come to rest at the stable operating point *a* which is in the cut-off region. If a positive pulse of sufficient magnitude to lift the operating point over the upper reflex point *c* of the characteristic at zero emitter current were applied to the emitter, the circuit would pass rapidly through the negative resistance region and come to rest at the other stable operating point *b*. If then a negative pulse of sufficient magnitude to lower the operating point below the lower reflex point *e* of the characteristic were applied to the emitter electrode, it would return to operating point *a*. This circuit (i. e., where $R_\epsilon = R_\epsilon'$ and $V_{\epsilon\epsilon} = V_{\epsilon\epsilon}'$) is, therefore, bistable.

If the emitter bias $V_{\epsilon\epsilon}$ is kept at the same value, $V_{\epsilon\epsilon}'$ and the resistance of the load-line resistor 15 is increased to a higher value $R_\epsilon''$, the slope of the load line would be increased to a value illustrated by the load line 28. This load line intersects the operating characteristic only in the negative emitter current positive resistance region at *a'*; it is, therefore, monostable. Assuming now a condenser 30 of suitable value to be shunted across the resistor 15 and supply 16, the circuit whose load line is represented by the load line 28 will normally be quiescent at the intersection *a'*. When a triggering pulse sufficient to raise the emitter voltage above the upper reflext point *c* is applied, the operating point will snap along a constant voltage line due to the condenser 30 to the right-hand branch of the characteristic in region III, reach this branch at the point *d*, follow the characteristic downward to the lower reflex point *e*, snap backward along another constant voltage line until it intersects the characteristic in region I at the point *f*, and then return along the characteristic to its stable starting point at *a'*. During this excursion, a useful negative pulse is produced at the collector electrode 13.

Assume now that the same value of load-line resistance is employed but the emitter supply is increased to a positive value $V_{\epsilon\epsilon}''$. The characteristic of such a load line is illustrated by the load line 29 in Fig. 2. This line intersects the circuit characteristic only in the negative resistance region, region II, at *a''*. In the absence of the condenser 30, this may represent a stable operating point if its slope is greater than the slope in region II; but due to the condenser 30, the circuit can never attain this point, and the actual operating point will continually follow the pattern defined by the points *c*, *d*, *e*, and *f*, and as such, the circuit will be astable.

In the circuit just described, input pulses may be applied to the terminals 31, while output may be taken from the terminals 32, which are effectively across the resistor 17.

Figure 3:
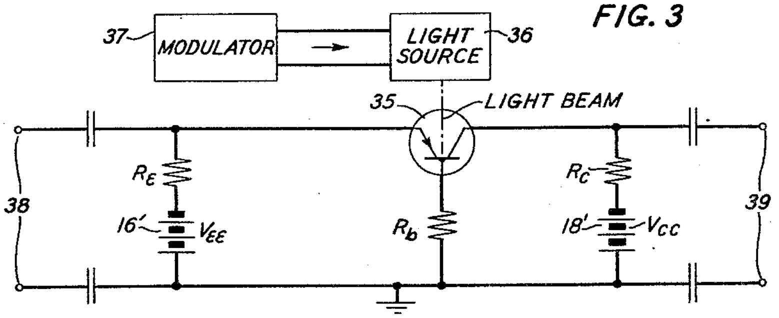
Fig. 3 illustrates schematically a photosensitive trigger circuit embodying principles of the present invention.

The circuit illustrated in Fig. 3 employs as its central element a trigger circuit of the type just described. The transistor 35, however, is photosensitive, and a light source 36, modulated by a modulator 37, is positioned to emit light on the sensitive surface of the transistor. The characteristic of this circuit, shown in Fig. 4, has been broken into three regions with the characteristic in each region being approximated by a straight line. This assumption, namely, that the negative resistance characteristic can be approximated by three straight lines, is reasonably valid for most considerations. Further, this idealization does not depart markedly from actual curves. In accordance with the principles of the present invention, the load-line resistor $R_\epsilon$ has a value of resistance whose slope, when plotted on current-voltage coordinates, is substantially equal to the absolute value of the slope of the circuit characteristic in the negative resistance region II. Since the characteristic in region II has a slope approximately equal to $$R_b\left(1-\frac{R_b+r_m}{r_c+R_b}\right)$$

where $R_b$ is the feedback resistor, and $r_m$ and $r_c$ are the equivalent transistor parameters, as defined in the above-cited Ryder-Kircher article, the load-line resistor should also have a value approximately equal to $$R_b\left(1-\frac{R_b+r_m}{r_c+R_b}\right)$$

The load line will then lie parallel to the characteristic in region II. Furthermore, the voltage $V_{\epsilon\epsilon}$ supplied by the battery 16′ is chosen to have a value which is slightly more negative than the emitter voltage at zero emitter current which in the figure is also the upper reflex point *c*. The circuit, therefore, has only one stable operating point, viz., the one at *a*, in the absence of input signals.

Figure 4:
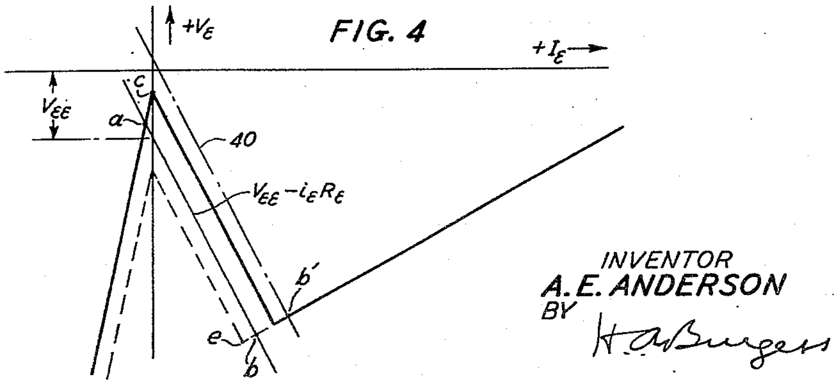
Fig. 4 illustrates characteristics of the circuit of Fig. 3.

Applying light of sufficient intensity from the light source 36 to the transistor 35 modifies the circuit characteristic to that represented by the dashed line in Fig. 4. The light causes more current to flow in the collector circuit by releasing hole-electron pairs in the semiconductive body of the transistor and is equivalent to the addition of a current generator in series with the collector electrode. It may be shown that the characteristics differ in regions I and II by an amount which is essentially a direct voltage quantity and which is a function of the quantum efficiency of the transistor and of the intensity of the light. In region III, the equivalent collector resistance reduces to substantially zero so that the characteristic in the saturation region remains unaffected by the presence or absence of the light.

Assuming the light source 36 to be "off", the circuit will be quiescent at its stable operating point *a* in the negative emitter current region. If sufficient light is then applied to the transistor to effectively lower the operating characteristic to that illustrated by the dashed line, the circuit will no longer have a stable operating point in the cut-off region. It will, however, now have a stable operating point *b* in the positive emitter current region and will rapidly snap to this point and remain there as long as the light is kept on. When the light is removed, however, there is no longer a stable operating point in the positive emitter current region, and the operating point will snap back to point *a* in the cut-off region. It may be seen, therefore, that a pulse will appear at the collector electrode whose duration is directly related to the duration of the light signal on the transistor. This pulse may be delivered to an output circuit connected to the output terminals 39. The circuit snaps between its two operating points quite rapidly since there is no shunt capacitance other than inherent wiring capacitance across the emitter circuit such as that provided by the condenser 30 in Fig. 1.

The circuit just described may also be triggered by electrical pulses applied, for example, to the emitter electrode by way of the input terminals 38. Although the operation is the same, the analysis is somewhat different. Instead of altering the circuit characteristic, applying input pulses effectively raises the load line to a position indicated by the broken line 40. The circuit will then snap to a stable point *b′* in the positive emitter current region, remaining there until the input pulse is removed.

It has been stated that the load line should lie substantially parallel to the characteristic in region II. From the characteristics in Fig. 4, it may be seen that some deviation from exact parallelism can be permitted. It is only necessary that one and only one stable operating point be defined in the absence of input signals and that a second stable operating point be defined in their presence.

Figure 5:
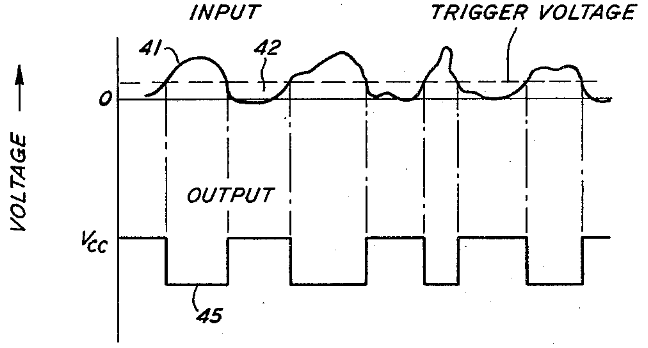
Fig. 5 illustrates input and output wave forms for the circuit of Fig. 3, the wave form for the input signals representing either light intensity for light signals or voltage for electrical signals.

The wave form 41 in Fig. 5 illustrates a train of length modulated pulses 41 which have become distorted, for example, by noise. This wave form may represent voltage variations in the case of electrical signals, or light intensity variations for the case of light signals. The dotted line 42 illustrates the threshold value for triggering of the circuit of Fig. 3; it is assumed that the voltages, or light intensities, required to trigger the circuit from both its stable operating points *a* and *b* are equal. If this train of pulses 41 is applied to the transistor in Fig. 3, either as light to the semiconductive body or as electrical signals to the input terminals 38, the regenerated square-topped negative going pulses illustrated by the wave form 45 in Fig. 5 will appear at the output terminals 39.

The principles of the present invention are equally applicable regardless of the two terminals at which the characteristic is determined. In Fig. 6, the load-line resistor is the resistor $R_c$ connected in the collector circuit. The collector current versus collector voltage characteristic is illustrated in Fig. 7, the three regions in I (cut-off), II (active), and III (saturation) being illustrated as above. The resistor $R_c$ is again chosen with a value of resistance such that the load line will be approximately parallel to the circuit characteristic in region II. The slope in region II is given, to an approximation, by the expression $r_c(1-\alpha)$. Further, the collector supply $V_{cc}$ is adjusted so that the load line intersects the characteristic at a point *a* above the first reflex point. It may be seen that this circuit will normally be quiescent at the point *a* proceeding to the operating point *b* when triggered, for example, by light from the source 50, remaining there as long as the light remains "on" and returning to the point *a* when the light is turned off. This will occur whether the trigger is a negative pulse applied to the collector electrode or a light pulse applied to the light-sensitive transistor. If light pulses are applied as input signals, an output circuit may be connected to the terminals 51. The circuit may also be employed as a two-terminal network, with triggering resulting from variations in a load circuit connected to these terminals.

In Fig. 8, the point of analysis is shifted to the base circuit. Fig. 9 illustrates the base current versus base voltage characteristic of this circuit, the base voltage being measured from the base electrode to ground. The load-line resistor $R_b$ is connected from the base to ground and is again proportioned to have a value such that the load line will lie parallel to the characteristic in region II. The slope in region II is approximately equal to $$r_b+\frac{r_\epsilon+R_\epsilon}{1-\alpha}$$

where $r_b$ and $r_\epsilon$ are equivalent transistor parameters also defined in the above-cited Ryder-Kircher article. This circuit may also be triggered by light pulses from the source 52 with a load connected to the terminals 53 or, alternatively, the circuit may be employed as a two-terminal network with electrical triggering. In the circuit of Fig. 8, the collector resistor $R_c$ is preferably small.

The circuit of Fig. 10 is a start-stop pulse generator. The load-line resistor $R_\epsilon$ in this case is chosen with a value such that it intersects the characteristic in the absence of input in region I and when light is applied in region II. With the condenser 54, the circuit in the presence of light will be astable and will emit a continuous train of pulses as long as the incident light remains "on." When the light is removed, the circuit will return to its "off" condition at its stable operating point *a*.

Although the invention has been described as relating to particular embodiments, the invention should not be deemed limited to those specifically illustrated, since other embodiments and modifications will readily occur to one skilled in the art.

What is claimed is:

1. In combination: a transistor trigger circuit having a cut-off operating region, an active operating region, and a saturation operating region, said transistor having an emitter electrode, a collector electrode and a base electrode, means for applying input signals to said transistor, means for deriving output signals from said transistor, and a resistor connected in circuit with two of said electrodes and having a value of resistance substantially equal to the average resistance across said two electrodes in said active region.

2. In combination: a light-sensitive transistor having an emitter electrode, a collector electrode and a base electrode; a first circuit including a first source of potential interconnecting said emitter and base electrodes, said first source of potential poled to oppose the flow of positive emitter current; a second circuit including a second source of potential interconnecting said collector and base electrodes; means for promoting sufficient regenerative feedback from said second circuit to said first circuit to give rise to a region of negative resistance in the emitter current versus emitter voltage characteristic of said transistor; a resistor in series with said first source of potential, said resistor having a value of resistance substantially equal to the absolute magnitude of said negative resistance; an input circuit comprising a source of light positioned to emit light on said transistor; means comprising said first source for applying to said emitter electrode a biasing voltage which is only slightly more negative than the emitter voltage at zero emitter current, and an output circuit coupled to said second circuit.

3. Apparatus for converting a pulse of light into an electrical pulse whose duration is substantially equal to the duration of said light pulse which comprises: a photosensitive transistor comprising a body of light-sensitive semiconductive material with which an emitter electrode, a collector electrode and a base electrode make operative contact; a first circuit interconnecting said emitter and base electrodes; a second circuit interconnecting said collector and base electrodes and including a first source of potential; a first resistor included in said first and second circuits and connected in series with said base electrode, said resistor having a value of resistance sufficient to promote regenerative feedback from said second circuit to said first circuit whereby the emitter current versus emitter voltage characteristic of said transistor has a region of negative slope bounded on either side by regions of positive slope with which it is continuous; a second resistor in said first circuit having a value of resistance whose slope, when plotted on current-voltage coordinates, has an absolute value substantially equal to the slope of said negative slope; a second source of potential connected in said first circuit in series with said second resistor and proportioned to bias said emitter electrode slightly more negative than the potential of said emitter electrode at zero emitter current; input means comprising a source of light and means for shining the light from said source on said semiconductive body; and an output circuit coupled to said collector electrode.

4. A trigger circuit comprising, in combination, a transistor having a body of semiconductive material and emitter, base, and collector electrodes, an emitter-base circuit and a collector-base circuit for said transistor, a first resistor connected in one of said emitter-base and collector-base circuits, a feedback resistor in series with said base electrode and common to said emitter-base and collector-base circuits, said feedback resistor giving rise to a region of negative resistance intermediate two regions of positive resistance in the current-voltage characteristic of said one circuit, a source of trigger pulses for said trigger circuit, means for applying said trigger pulses to said transistor, means comprising a source of direct current connected in series with said first resistor for conditioning said transistor to trigger in response to said applied trigger pulses and said first resistor having a resistance value substantially equal to the absolute value of said negative resistance.

5. The combination in accordance with claim 4 wherein said semiconductive body comprises photosensitive material, said source of trigger pulses comprises a source of light, and said means for applying trigger pulses to said transistor comprises means for illuminating the surface of said photosensitive material with said light pulses.

6. The combination in accordance with claim 4 wherein said means for applying trigger pulses to said transistor comprises means for applying said trigger pulses to said one circuit.

References Cited in the file of this patent

UNITED STATES PATENTS

| | | |
|---|---|---|
| 2,524,035 | Bardeen | Oct. 3, 1950 |
| 2,560,606 | Shive | July 17, 1951 |
| 2,570,978 | Pfann | Oct. 9, 1951 |
| 2,579,336 | Rack | Dec. 18, 1951 |
| 2,582,850 | Rose | Jan. 15, 1952 |